No. 608,480. Patented Aug. 2, 1898.
A. RITTER.
APPARATUS FOR DRAWING LIQUIDS.
(Application filed Dec. 29, 1897.)
(No Model.) 2 Sheets—Sheet 2.
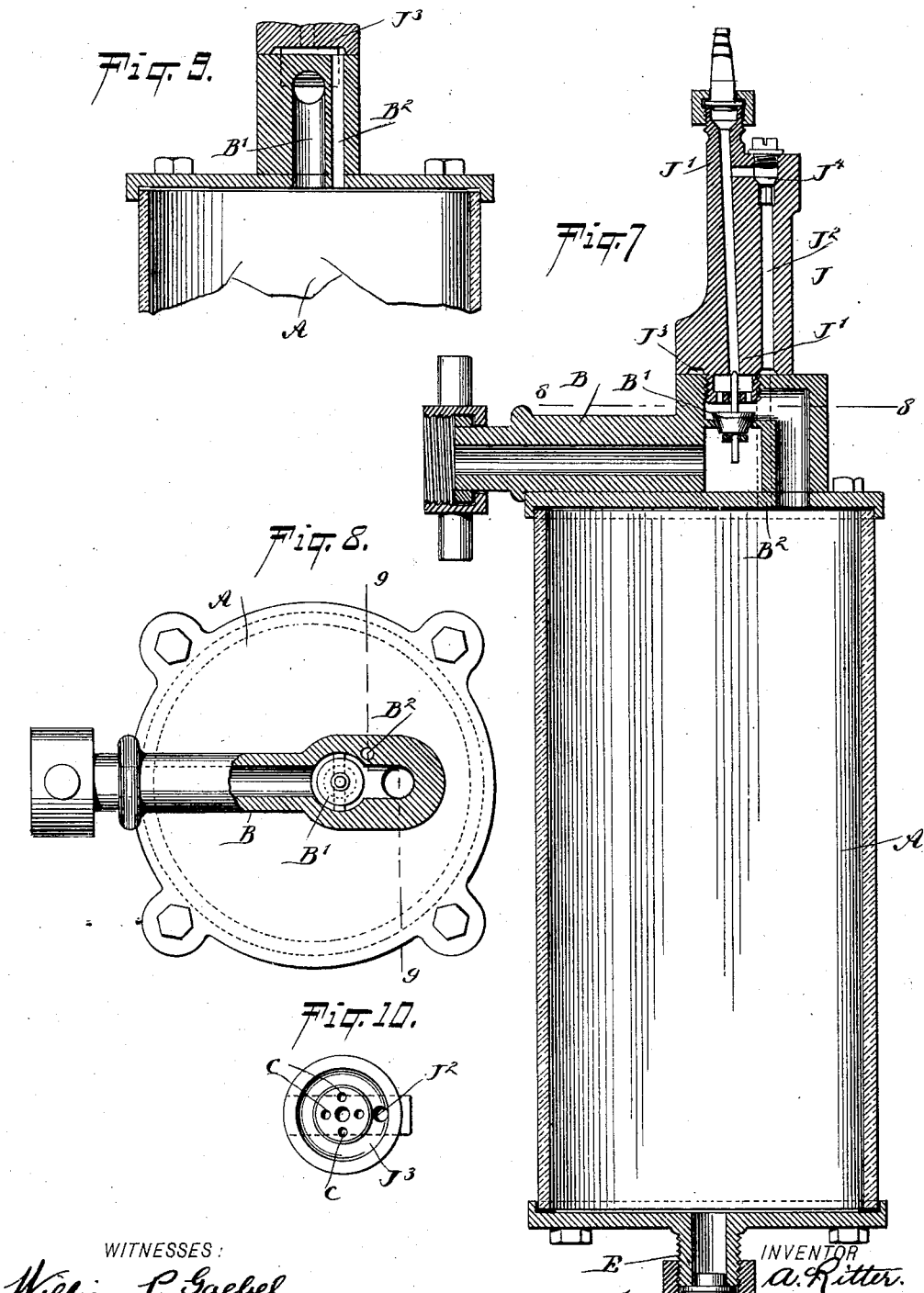
WITNESSES:
William P. Gaebel.
INVENTOR
A. Ritter.
BY
ATTORNEYS.

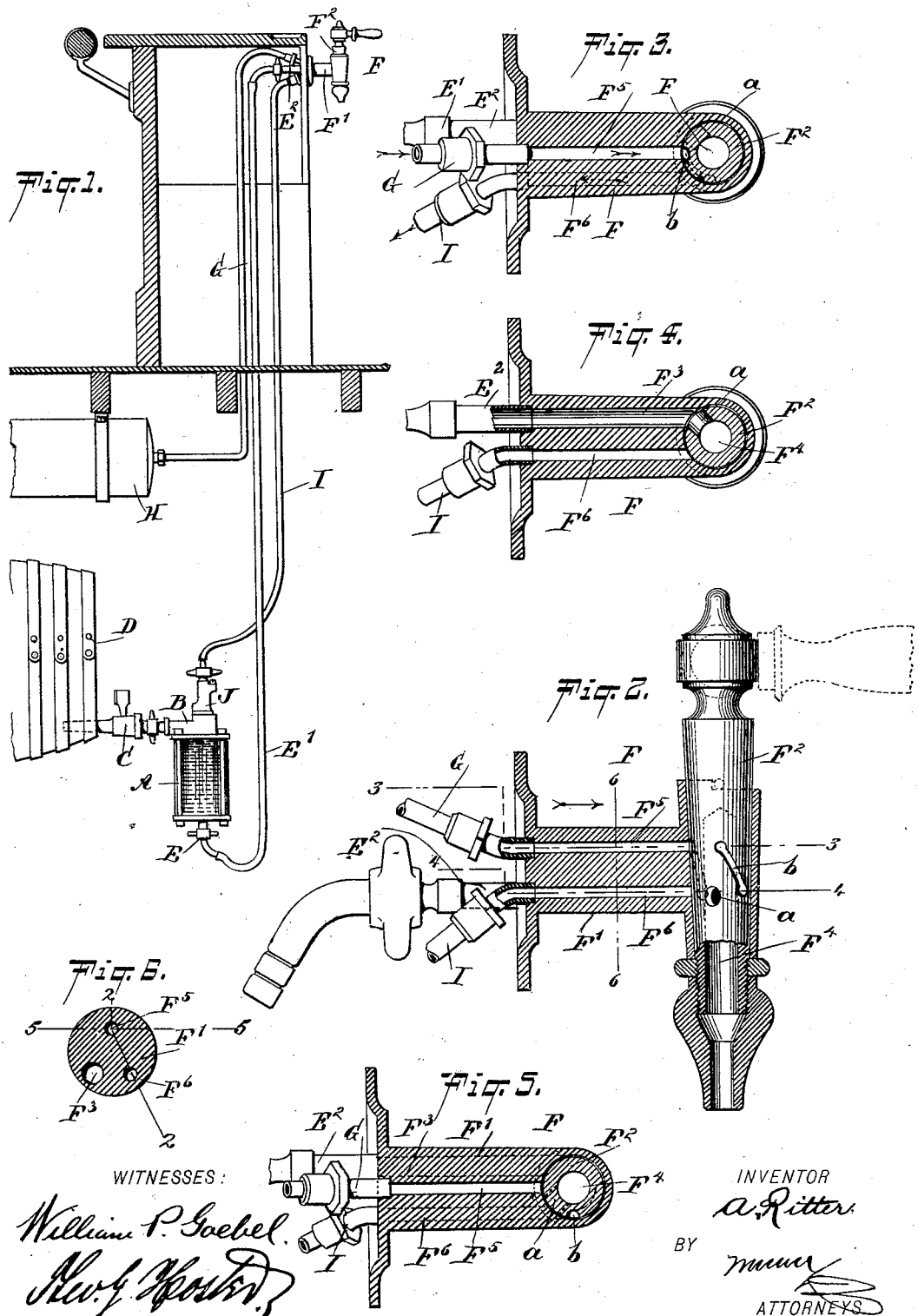

UNITED STATES PATENT OFFICE.

ALEXANDRE RITTER, OF BASLE, SWITZERLAND.

APPARATUS FOR DRAWING LIQUIDS.

SPECIFICATION forming part of Letters Patent No. 608,480, dated August 2, 1898.

Application filed December 29, 1897. Serial No. 664,276. (No model.) Patented in Switzerland May 19, 1897, No. 14,327.

*To all whom it may concern:*

Be it known that I, ALEXANDRE RITTER, a citizen of the French Republic, residing in the city of Basle, Switzerland, have invented a new and Improved Apparatus for Drawing Liquids, (for which I have obtained Letters Patent in Switzerland, No. 14,327, dated May 19, 1897,) of which the following is a full, clear, and exact description.
The invention relates to apparatus for forcing a liquid by the pressure of air or gas from a keg, barrel, or like receptacle located in a cellar to and through a faucet for retailing purposes.
The object of the invention is to provide a new and improved apparatus more especially designed for drawing wine, ale, or like liquids apt to leave a foam or sediment in the receptacle containing it, the apparatus being arranged to permit of conveniently withdrawing such liquid without disturbing the sediment and rendering the liquid cloudy and unfit for immediate use.

The invention consists of novel features and parts, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement as applied, parts being in section. Fig. 2 is an enlarged sectional side elevation of the faucet on line 2 2 of Fig. 6. Fig. 3 is a sectional plan view of the same on the line 3 3 of Fig. 2, showing the valve-plug in a different position. Fig. 4 is a similar view of the same on the line 4 4 of Fig. 2, with the valve-plug in the same position as in Fig. 3. Fig. 5 is a like view of the same on the line 5 5 of Fig. 6, with the valve-plug in a different position. Fig. 6 is a cross-section of the same on the line 6 6 of Fig. 2. Fig. 7 is an enlarged sectional side elevation of the receiving-receptacle. Fig. 8 is a sectional plan view of the same on the line 8 8 of Fig. 7. Fig. 9 is a transverse section of part of the same on the line 9 9 of Fig. 8, and Fig. 10 is an inverted plan view of the air-pressure pipe.
The improved apparatus is provided with a closed receptacle A, preferably having its main body portion made of glass to permit of viewing the contents of the receptacle. The top of the receptacle A is provided with an inlet B, arranged for connection with a spigot C, driven into a barrel, keg, or like vessel D, containing the liquid to be drawn, the receptacle extending below the said keg or barrel D to permit the liquid to flow by its own gravity from the keg or barrel into the said receptacle A to fill the same, as hereinafter more fully described.

The lower end of the receptacle A is provided with an outlet E, connected by a tube or pipe E' with a pipe $E^2$, attached to a faucet F, arranged under the bar above the barrel D, as indicated in Fig. 1. The faucet F is also connected by a pipe G with an air or gas supply H, containing air or gas under pressure, and the said faucet F is also connected by a tube or pipe I with an air-pressure pipe J, screwed or otherwise attached to the inlet B, as hereinafter more fully described.

The pipe $E^2$ connects with the body F' of the faucet F by a channel $F^3$, adapted to be connected by a port $a$ with the bore $F^4$ of the faucet-plug $F^2$, so that the liquid from the receptacle A can flow through the pipes E E' $E^2$, channel $F^3$, port $a$, and bore $F^4$ into a glass or other vessel held at the outlet of the faucet at the time the latter is opened. (See Fig. 4.) A pipe G opens into a channel $F^5$, likewise formed in the body F' of the faucet F, and this channel $F^5$ is adapted to connect by an angular recess or port $b$ with a channel $F^6$, connecting with the pipe I, the said port $b$ being formed in the face of the plug $F^2$, as is plainly indicated in Fig. 2.

The arrangement of the ports $a$ and $b$ is such that when the port $a$ connects the channel $F^3$ with the bore $F^4$ then the channel $F^5$ is connected by the port $b$ with the channel $F^6$ to allow air or gas under pressure from the supply H to pass through the pipe G, channel $F^5$, port $b$, channel $F^6$, and pipe I to an air-supply pipe J to close the valve B' in the inlet B and disconnect the barrel D and the receptacle A and to allow the air to flow through part of the bore of the inlet $b$ into the top of the receptacle A and exert a pressure on the liquid contained therein, so as to force the liquid out through the pipes E E' $E^2$, the channel $F^3$, port $a$, and bore $F^4$ to a glass or other vessel to be filled. This takes place when the valve-plug F² is in an open position; but when the said valve-plug is given a quarter-turn and is moved into a closed position then the port a is disconnected from the channel F³ and connected with the channel F⁶, while the port b is out of register with its channels F⁵ and F⁶. The air in the pipes I and J can now escape, through the channel F⁶, port a, and bore F⁴, to the outside, so as to form a vent for the inlet B and the receptacle A to allow the liquid from the keg D to flow by its own gravity past the valve B' into the receptacle A, so as to again fill the same.

It is understood that the valve B', arranged in the bore F⁴ of the inlet B, is lifted off its seat by the pressure of the liquid contained in the barrel D, the said valve in rising closing apertures c formed in the pressure-pipe J and in communication with a channel J', leading to the pipe I. Thus when the faucet is closed and the air-pressure is removed from the pipe I then the valve B' is free to open by the pressure of the liquid from the barrel D, so that the liquid can flow through the bore of the inlet B and fill the receptacle A, but when the pressure is turned on the valve B' immediately closes, so as to interrupt the communication between the interior of the receptacle A' and the barrel D, and the air from the pipe I can pass through the channel J' and apertures c to force the valve B' to its seat and to pass through the remainder of the bore of the inlet B into the receptacle A.

In the top of the receptacle A is also formed a vent-opening B², formed on the under side of the pressure-pipe J. (See Figs. 7, 8, and 9.)

A groove J³ is connected by a channel J² with the channel J', and a check-valve J⁴ is arranged in this channel J², so as to allow air to escape from the vessel A by way of the channels B², groove J³, channel J², into the channel J', and, through the pipe I and the connection previously mentioned, through the plug of the faucet to the outside at the time the faucet is closed and the receptacle A is filling with liquid from the barrel or keg D. When, however, the air-pressure is turned on, the check-valve J⁴ closes, so that air cannot escape from the receptacle A by way of the channel J².

Now it is evident that by the arrangement described the operator upon closing the faucet allows an automatic filling of the receptacle A with liquid from the barrel D, and as this filling is without heavy air-pressure in the said barrel it is evident that the liquid quietly flows from the barrel into the receptacle without disturbing the sediment and rendering the liquid cloudy. When the faucet is opened, the connection between the barrel and the receptacle is shut off and the air-pressure is applied to the liquid in the receptacle, so as to force the liquid out of the faucet, as described, and into the glass to be filled. Upon closing the faucet the above-described operation is repeated—that is, the receptacle will refill gradually.

Having thus fully described my invention, I claim as new and desire to secure by Letters Patent—

1. A receptacle having a liquid-inlet, a liquid-outlet, an inlet for compressed air or the like, and a valve having two seats, one in the air-inlet and the other in the liquid-inlet, one inlet being closed when the other is open.

2. A receptacle having a liquid-inlet, a liquid-outlet, an air-inlet, a valve controlling both the air-inlet and the liquid-inlet, one inlet being closed when the other is open, a faucet having an outlet, connections to the liquid-outlet and air-inlet of the receptacle, and an air-supply connection, and a plug controlling the several connections.

3. An apparatus of the class described, provided with a receiving-receptacle having a valved liquid-inlet for connection with a barrel containing the liquid to be drawn, and an air-pressure inlet-pipe opening into the valved liquid-inlet, to close the valve therein to interrupt the communication between the barrel and the receptacle, and to permit the air to flow into the receptacle to force the liquid therein to the faucet, substantially as shown and described.

4. An apparatus of the class described, provided with a receiving-receptacle having a valved inlet for connection with a barrel containing the liquid to be drawn, an air-pressure inlet-pipe opening into the valved inlet, to close the valve therein to interrupt the communication between the barrel and the receptacle, and to permit the air to flow into the receptacle, to force the liquid therein to the faucet, and a faucet having a connection with an air-pressure supply, with the air-pressure pipe and with the lower end of the said receptacle, to connect the air-pressure supply with the air-inlet pipe at the time the faucet is open, so that the air-pressure forces the liquid from the receptacle to and through the faucet, substantially as shown and described.

5. An apparatus of the class described, provided with a receiving-receptacle having a valved inlet for connection with a barrel containing the liquid to be drawn, an air-pressure inlet-pipe opening into the valved inlet, to close the valve therein to interrupt the communication between the barrel and the receptacle, to force the liquid therein to the faucet, and a faucet having a connection with an air-pressure supply, with the air-pressure pipe and with the lower end of the said receptacle, to connect the air-pressure with the air-inlet pipe at the time the faucet is open, so that the air-pressure forces the liquid from the receptacle to and through the faucet, the said valve when closed cutting off the air-supply to the receptacle, and venting the air-inlet pipe to the outside, to allow a refilling of the receptacle, substantially as shown and described.

6. A receptacle having a liquid-inlet, a liquid-outlet, and an air-inlet, in combination with a faucet having an outlet, connections to the liquid-outlet and air-inlet of the receptacle, and an air-supply connection, and a plug capable of two positions and having channels effecting the following connections: first position, faucet-outlet with liquid-outlet of receptacle, air-supply connection with connection to air-inlet of receptacle; second position, faucet-outlet with air-inlet of receptacle.

7. A receptacle having a liquid-inlet, a liquid-outlet, an air-inlet, a valve controlling both the liquid-inlet and the air-inlet and closing the one when it opens the other, a vent connecting the receptacle with that portion of the air-inlet which is exteriorly of the valve, and an outwardly-opening check-valve in said vent.

8. A receptacle having a liquid-inlet, a liquid-outlet, an air-inlet, a valve having two seats, one in the air-inlet and the other in the liquid-inlet, one inlet being closed when the other is open, a faucet having an outlet, a connection to the liquid-outlet of the receptacle, a second connection to the air-inlet of the receptacle, and a third connection for supplying compressed air, and a plug controlling the several connections.

9. A receptacle having a liquid-inlet, a liquid-outlet, an inlet for compressed air or the like, said air-inlet and liquid-inlet having their inner end portions in common, and a double-seat valve located in said common end portion of the two inlets and arranged to close one inlet when the other is open.

ALEXANDRE RITTER.

Witnesses:
GEORGE GIFFORD,
AMAND RITTER.